Oct. 3, 1950     B. F. BLACKMARR     2,524,027
WHEEL MOUNTING MEANS
Filed May 5, 1945
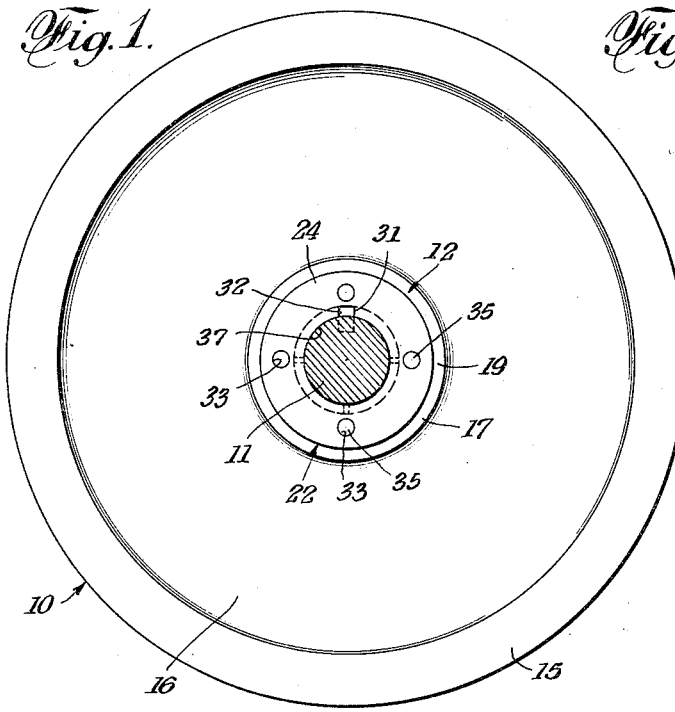
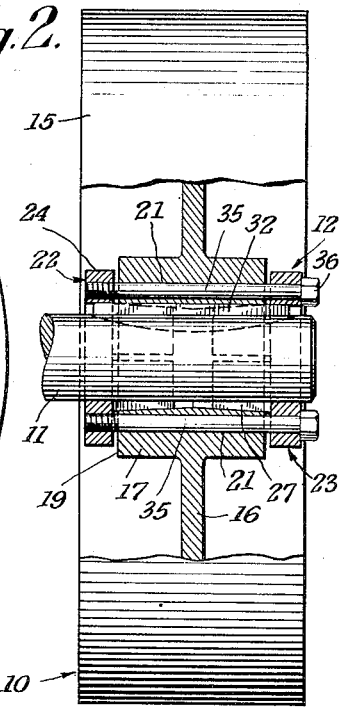
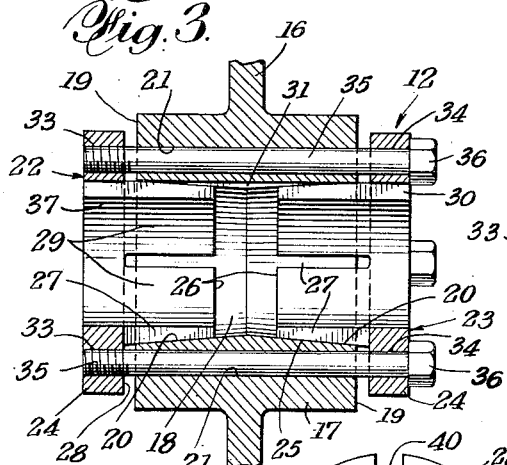
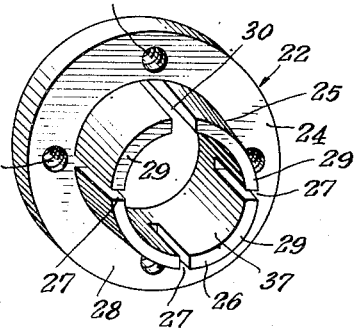
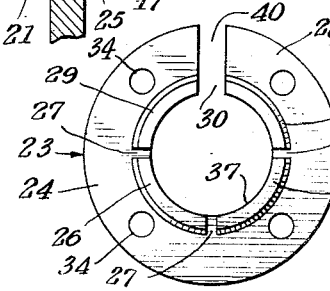
INVENTOR.
BYRON F. BLACKMARR
BY
ATTORNEY Patented Oct. 3, 1950

2,524,027

UNITED STATES PATENT OFFICE 2,524,027

WHEEL MOUNTING MEANS

Byron F. Blackmarr, Oildale, Calif., assignor to Hopper Machine Works, Inc., Bakersfield, Calif.

Application May 5, 1945, Serial No. 592,189

2 Claims. (Cl. 287—52.06)

This invention relates to mounting means for wheels, and the like, and relates more particularly to wheel hub structures.

Under certain circumstances, and particularly in the oil fields, at mines, etc., much time is now lost when installing machines or when making certain repairs such as have heretofore required operations to be performed by machine shop equipment. For example, it is necessary to suspend the operation of machinery when installing a flywheel or when pulling a defective flywheel. When a wheel such as a flywheel is installed, accuracy is essential to eliminate unbalanced centrifugal forces and to insure against wobble of the wheel on its shaft. Ordinarily such an installation requires precision machining operations on both the shaft and wheel.

An object of the present invention is to provide wheel mounting means enabling quick and accurate field mounting of a wheel. The invention is particularly useful in the mounting of flywheels.

Another object of the invention is to provide a wheel hub structure of simple and effective design for facilitating the rapid and accurate mounting of a wheel upon a shaft.

The various objects and features of my invention will be fully understood from the following detailed description of typical preferred forms and applications of the invention, throughout which description reference is made to the accompanying drawing, in which:

Fig. 1 is a side elevational view of a wheel mounted on a shaft and embodying the invention, the shaft being shown in cross-section.

Fig. 2 is a side view thereof, partly in central section.

Fig. 3 is an enlarged sectional view of the hub structure shown in Fig. 2 with the shaft removed.

Fig. 4 is a perspective view of an element of the hub structure.

Fig. 5 is a perspective view of an inside end view of a modification of a taper sleeve employed in the invention.

In the preferred embodiment of the invention illustrated in Figs. 1 to 4, inclusive, and which is intended only as exemplary thereof, a wheel 10 is shown as mounted upon a shaft 11 as by the hub structure 12 made according to this invention.

The wheel 10 may comprise a rim 15 and a web 16. These wheel parts may be of typical design and the web 16 may be formed as arms in a conventional manner. The wheel 10 also includes a central hub 17 and, in the present instance, it is preferred to form the bore 18 of said hub with tapers, one from each outer hub face 19 inward to the center of the bore 18. The bore 18 is thus outwardly flared from its center in both directions as shown at 20. The hub 17 may also be provided with a plurality of preferably uniformly spaced through holes 21 extending from face to face of said hub, and, therefore, co-extensive with the bore 18. Said holes may be arranged around the bore and adjacent thereto.

The hub structure 12 that I have provided may include a pair of substantially similar wedge members characterized by sleeves 22 and 23. Each sleeve has a flange 24 at one end thereof and the outer peripheral surface of each sleeve is preferably tapered as at 25 from a larger diameter at the flange 24 to a smaller diameter at its inner face 26. The taper of the sleeves 22 and 23 is preferred to be substantially the same as the tapers 20 of the bore 18. Each of the taper sleeves 22 and 23 is also preferably formed with a plurality of uniformly spaced longitudinal slots 27 which extend from the sleeve end 26 to the inner face 28 of the flange 24 to divide the sleeve into longitudinally disposed segments in the nature of arcuate fingers or the like 29, having a degree of resiliency whereby each sleeve may function as a spring collet. The slots 27 may all be identical. However, should accommodation be desired for a key or feather, one of said slots such as the slot 30 of each sleeve 22 and 23 may be made wider for this purpose. When a slot is provided for a key it is extended through the flange part 24 as illustrated in Fig. 3.

When a key is used, the hub 17 is provided with a keyway 31, which together with the slots 30 of the sleeves 22 and 23, affords a common keyseat for the key or feather 32 shown in Figs. 1 and 2.

Each flange 24 has a plurality of uniformly spaced holes arranged around the axial center of the sleeve for alignment with the holes 21 in the hub 17. The holes 33 in the sleeve 22 may be threaded and the holes 34 in the sleeve 23 may be clearance holes for means such as bolts 35 which are arranged to pass through the respective aligned holes 34, 21 and 33. Each bolt 35 has a head 36 to engage the flange having the holes 34 and by means of which the bolt may be operated to be inserted into and removed from its position connecting the flanges.

The holes 21 in the hub 17 and the holes 33 and 34 of the respective sleeves 22 and 23 are preferably oriented with respect to the respective keyseats 30 and 31 to effect alignment of said keyseats when the taper sleeves are positioned in the hub for reception of the key 32.

The bore 37 of each sleeve 22 and 23 may vary in diameter. The approximately largest diameter is shown in the drawing and said diameter may be smaller to any degree affording resiliency of the fingers 29. Thus, by providing a suitable selection of taper sleeves, the wheel may be securely and accurately mounted on shafts varying somewhat in diameter.

Each of the sleeves 22 and 23 may be modified as shown in Fig. 5. When machining the slot 30, which extends between the sleeve end 26 and the outer face of the flange 24, the flange may, also, be through slotted as shown at 40. In this case, the holes 33 or 34 may be arranged as shown in radial alignment with the fingers 29. The holes 21, in the hub 17 of the wheel will, of course, be oriented accordingly so as to provide for key receiving alignment of the slot 30 and the keyway 31. The slot 40 provides an interrupting gap in the taper sleeves 23 and 22 whereby said sleeves are each more resilient and afford greater flexibility in use.

When mounting a wheel, taper sleeves having bores of suitable size are selected and placed snugly into both tapered bore parts 20 of the hub of the wheel with the slots 30 of said sleeves in alignment with the keyway 31 of said hub. The bolts 35 are then placed in position but left in slacked off condition. The key 32 is then inserted in the shaft keyway, and the wheel, together with its hub assembly 22, slid onto the shaft. The bolts 35 may then be taken up to draw the taper sleeves 22 and 23 toward each other and to cause the fingers 29 of the sleeves to be inwardly sprung in the nature of a spring collet as the tapers 25 of the sleeves slide into the tapers 20 of the wheel bore. By careful tightening of the bolts 35, and checking the angle of the wheel face with respect to the shaft axis, the power exerted by the taper of the parts will cause a gradually increased and substantially uniform gripping force of the fingers 39 on the shaft. It may be seen that when the bolts 35 have been fully tightened, the wheel will be firmly, properly and securely mounted and, even without the key 32, will be effectively secured. Unless high starting torques on the shaft are involved said key may be omitted.

It will be noted that forces set up by rotation of the shaft are centrifugal and, therefore, normal of the shaft axis whereas the lines of application of the forces applied for mounting the wheel are longitudinal with said shaft axis. It follows, then, that the rotational forces cannot become effective to loosen the hub assembly. Also, it will be noted that the bolts 35 are in tension and, therefore, may be strained to a high degree in their application. It will be further seen that any possible shearing forces on the bolts which may be exerted only by relative rotational tendencies between the wheel and the taper sleeves 22 and 23, are effectively nullified by the highly frictional engagement of the tapers of the components of the hub assembly.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. In combination, a shaft, a wheel with an axial bore having outwardly flaring tapers from the center thereof and formed with a key slot extending longitudinally thereof, said wheel also having uniformly spaced axially disposed openings around said bore and extending through it from one end to the other, a tapered sleeve in each taper of the wheel bore and around the shaft, a flange at the large end of each of said sleeves and having openings aligned with the spaced openings of the wheel, said sleeves having a plurality of longitudinal slots dividing them into shaft gripping fingers, one of said slots being wider than the others and aligned with the mentioned key slot in the hub to form a keyway, a key on the shaft having driving engagement with the slots in the sleeves and the slot in the hub, and means guided in the openings in the wheel and engaged in the openings in the flanges for driving engagement and for drawing said sleeves toward each other.

2. In combination, a shaft, a wheel having an axial bore with outwardly flaring tapers from the center thereof and formed with a longitudinally disposed key slot, said wheel also having uniformly spaced axially disposed openings around said bore and extending through the wheel from one end to the other, a tapered sleeve in each taper of the wheel bore and around the shaft, a radially projecting annular flange on the large end of each of said sleeves, each flange having openings aligned with the spaced openings of the wheel, said sleeves having a plurality of longitudinal slots dividing said tapered sleeves into shaft gripping fingers, one of the slots in each sleeve being wider than the others and extending through the flange joined with the sleeve and aligned with the mentioned key slot in the hub to form a keyway, a key on the shaft having driving engagement with the slots in the sleeves and the slot in the wheel bore, and bolts guided in said openings in the wheel and having their heads engaged with the flange of one of the sleeves and threaded to the flange to the other sleeve for driving engagement and for drawing said sleeves toward each other.

BYRON F. BLACKMARR.

REFERENCES CITED

The following references are of record in the file of this patent:

UNITED STATES PATENTS

| Number | Name | Date |
| --- | --- | --- |
| 355,062 | Cook | Dec. 28, 1886 |
| 364,537 | Miller | June 7, 1887 |
| 668,017 | Pessano | Feb. 12, 1901 |
| 733,408 | Mack | July 14, 1903 |
| 827,346 | Bubb | July 31, 1906 |
| 929,762 | Hess | Aug. 3, 1909 |
| 1,009,729 | Ekeberg et al. | Nov. 28, 1911 |
| 1,377,101 | Sparling | May 3, 1921 |
| 1,378,091 | Carlsen | May 17, 1921 |
| 1,382,606 | Norton | June 21, 1921 |
| 1,454,657 | Smith | May 8, 1923 |
| 1,670,381 | Rogers | May 22, 1928 |
| 2,262,112 | Nash | Nov. 11, 1941 |